United States Patent [19]
Hasegawa

[11] Patent Number: 6,012,089
[45] Date of Patent: Jan. 4, 2000

[54] MULTI-MEDIA COMMUNICATION TERMINAL CAPABLE OF PERFORMING SPECIAL REPRODUCING MODES

[75] Inventor: Satoshi Hasegawa, Tokyo, Japan

[73] Assignee: NEC Corporation, Tokyo, Japan

[21] Appl. No.: 08/797,060

[22] Filed: Feb. 12, 1997

[30] Foreign Application Priority Data

Feb. 15, 1996 [JP] Japan ................................. 8-027715

[51] Int. Cl.<sup>7</sup> .................................................. H04N 7/10
[52] U.S. Cl. ............................... 709/219; 348/7; 345/328
[58] Field of Search .................................. 348/7, 12, 13; 345/327, 328; 395/200.47–200.49; 705/217–219; 386/69

[56] References Cited

U.S. PATENT DOCUMENTS

| 5,206,722 | 4/1993 | Kwan ........................................ 358/86 |
| 5,341,474 | 8/1994 | Gelman et al. ........................... 395/200 |
| 5,652,627 | 7/1997 | Allen ......................................... 348/7 |
| 5,781,227 | 7/1998 | Goode et al. ............................. 348/7 |
| 5,805,155 | 9/1998 | Allibhoy et al. ......................... 345/327 |
| 5,815,146 | 9/1998 | Youden et al. ........................... 345/327 |
| 5,825,354 | 10/1998 | Ahmad et al. ............................ 386/69 |
| 5,873,022 | 2/1999 | Huizer et al. ............................. 348/7 |

FOREIGN PATENT DOCUMENTS 0 653 884  5/1995  European Pat. Off. .
4-243057  8/1992  Japan .
4-324784  11/1992  Japan .

OTHER PUBLICATIONS

"Patent Abstract of Japan" 07203416 (Aug. 1995).
"Patent Abstract of Japan" 07202933 (Aug. 1995).

*Primary Examiner*—Victor R. Kostak
*Attorney, Agent, or Firm*—Foley & Lardner

[57] ABSTRACT

In a multi-media communication terminal apparatus, when a slow reproducing operation is commenced, a supply of video data transmitted via a communication line is stopped. A video data decoding unit reproduces each image of screens plural times corresponding to the slow reproducing operation based upon the video data previously stored in a video data buffer memory. When the repeating reproduction for the respective screens by the plural times corresponding to the slow reproducing operation is accomplished and the reproducing operation of a new screen is commenced, a video data decoding unit issues an interrupt to a CPU. Upon issue of the interrupt, the CPU checks a data remaining amount of the video data stored in the video data buffer, and sends a request to transmit a predetermined amount of video data to a data transmission source when the checked data remaining amount is lower than, or equal to a reference amount. Since the remaining data amount is checked only when the video data for a single screen is consumed, a workload to execute the process operation is low.

4 Claims, 7 Drawing Sheets

MULTI-MEDIA COMMUNICATION TERMINAL CAPABLE OF PERFORMING SPECIAL REPRODUCING MODES

BACKGROUND OF THE INVENTION

The present invention relates to a multi-media communication terminal apparatus for receiving moving picture data and audio data transmitted via a communication line to reproduce these data, and more specifically to a multi-media communication terminal apparatus capable of performing a special reproduction of moving pictures such as a slow reproducing operation.

A number of pieces of video software for amusement purposes and also educational purposes have been supplied by use of media such as video tapes. In recent years, such amusement/educational video software has been supplied via communication lines, e.g., cable television (CATV) services in response to requests by audience. This type of television service is called "Video On Demand:VOD". Also, a terminal apparatus for receiving video software transmitted via communication lines is called a "multi-media communication terminal apparatus". The video-on-demand is greatly expected for utilizations in various fields, since even when the video software is not individually owned, the desirable video software can be always played.

Japanese Patent Application Disclosure No. Hei 4-324784 discloses a multi-media communication terminal apparatus capable of receiving a specific video software to which the individual subscribers have requested to observe. Usually, a video software supplier called a headend apparatus is employed in a CATV system. A large number of pieces of video software are stored in this headend apparatus. A multi-media communication terminal apparatus called a "settop box" is arranged in each of subscribers. A headend apparatus is connected to a settop box by way of a communication line.

To a settop box, a television set equipped with a display, or a predetermined interface circuit is connected so as to reproduce received video software. In this multi-media communication apparatus, a reception channel of a receiver unit for receiving a channel requested by a subscriber is remote-set by the headend apparatus side. The headend apparatus remote-sets the reception channel of the settop box of the subscriber functioning as an audience requesting source in order to receive such a channel through which the video software requested by the subscriber is transmitted. As a result, a program requested for audience can be transmitted by using an arbitrary empty channel.

In video-on-demand, another request may be issued to perform a special reproduction of video software sent via a communication line, for instance, a slow reproduction, or a pause of video software to reproduce a still image.

On the other hand, Japanese Patent Application Disclosure No. Hei 4-243057 discloses a multi-media communication terminal apparatus capable of reproducing video software in special modes. In this terminal apparatus, a output mode control code representative of information related to a special effect is provided within multi-media data as data about video software, in addition to video data and audio data. The reproducing apparatus reproduces video and audio in accordance with the output mode control code contained in the multi-media data. In response to special reproducing modes demanded by subscribers, various sorts of special reproducing operations can be carried out by rewriting the output mode control codes contained in video software.

In addition to video data for a normal reproducing mode, video data for the special reproducing mode is stored in the storage unit employed in the headend apparatus. When the special reproducing mode is requested from the multi-media communication terminal apparatus such as the settop box, the headend apparatus stops the supply of the video data for the normal reproducing mode, and starts the supply of the video data for the special reproducing mode combined with a time stamp instead of the normal video data. Accordingly, the special reproducing operation can be executed in response to the request issued from the subscriber in this headend apparatus.

In addition to the above-described terminal apparatus in which the video data for the special reproducing mode is supplied from the headend apparatus during the special reproducing operation, there is another multi-media communication terminal apparatus capable of performing the special reproducing operation with employment of the normal video data on the side of this multi-media communication terminal apparatus. For instance, in the multi-media communication terminal apparatus for executing the slow reproducing operation in half the normal reproducing speed, the video data received from the headend apparatus is once stored in the buffer memory, and then the stored video data is read out from this buffer memory in the speed suitable for the slow reproducing operation.

In such a terminal apparatus, the data amount of the video data read from the buffer memory per unit time becomes half of the data amount of the video data supplied from the headend apparatus. As a consequence, when the slow reproducing operation is continued for a time period exceeding a predetermined time period, the buffer memory will be brought into a overflow condition. To avoid this overflow condition, the supply of the video data and the stop of this data supply are sequentially instructed from the multi-media communication terminal apparatus to the headend apparatus. In the multi-media communication terminal apparatus, the remaining amount of the video data stored in the buffer memory is confirmed every predetermined time interval. When the confirmed remaining amount becomes below a reference value, this multi-media communication terminal apparatus requests the headened apparatus to supply a predetermined amount of video data which can be stored in an empty region of the buffer memory.

The above-described prior art owns the following disadvantages. That is, in such a conventional multi-media communication terminal apparatus for executing the special reproducing operation by employing the information such as the output mode control code, the video data having a preselected format capable of storing such specific information must be employed. Therefore, this type of terminal apparatus cannot have the general-purpose function. In another conventional terminal apparatus in which the video data for the special reproducing mode is stored on the side of the headend apparatus in addition to the normal video data, there is another problem that the storage data amount is increased, and thus a total number of pieces of video software which can be provided to the subscribers is decreased.

Also, in another conventional multi-media communication terminal apparatus for performing the special reproducing operation by controlling the data reading speed of the buffer memory, the data remaining amount of the buffer memory must be continuously and periodically confirmed. Therefore, there is another problem that the workload to execute this confirmation process is heavy. Moreover, since the video data is normally coded and compressed, the data amount of the video data required to reproduce a single image is varied. As a consequence, it is practically difficult to judge as to how long the video data can be reproduced by considering the data remaining amount of the buffer memory, which is periodically confirmed. As a result, the data amount must be set to a relatively large amount, which constitutes the reference amount used to issue the request for transferring the subsequent video data by the headend apparatus. Therefore, there is a further problem that the storage capacity of the buffer memory must be increased by taking account of this relatively large reference data amount.

SUMMARY OF THE INVENTION

Therefore, an object of the present invention is to provide a multi-media communication terminal apparatus capable of performing a special reproducing operation, using normal video data, while reducing the workload to execute a process operation for confirming a data remaining amount.

To achieve the above-described object, according to an aspect of the present invention, there provided a multi-media communication terminal apparatus which comprises: video data buffer memory means for temporarily storing video data transmitted via a communication line; slow reproduction designating means for designating a slow reproduction of the video data; video data reproducing means for reproducing each screen image indicated by the video data stored in the video data buffer memory means when the slow reproduction is designated by this slow reproduction designating means, and for outputting a predetermined control signal when the reproduction of a new image is commenced, each screen image being reproduced a plurality of times corresponding to the slow reproduction; transmission stop requesting means for requesting a transmission source of the video data to stop the transmission of the video data which is transmitted via the communication line when the slow reproduction is designated by the slow reproduction designating means; remaining amount acquiring means for checking the amount of video data remaining in the video data buffer memory means when the control signal is outputted from the video data reproducing means; and transmission requesting means for requesting said transmission source to transmit a predetermined amount of the video data when the amount acquired by the remaining amount acquiring means is lower than or equal to a predetermined reference amount.

Also, in the multi-media communication terminal apparatus, according to another aspect of the present invention, the reference amount corresponds to a predetermined amount which is larger than the amount of video data reproduced by the video data reproducing means during a overhead time required after a transmission request of video data is issued until the video data is transmitted via the communication line; and the storage capacity of the video data buffer memory is greater than an amount defined by adding said predetermined amount when transmission is requested by the transmission requesting means to the reference amount.

Also, in the multi-media communication terminal apparatus, according to a further aspect of the present invention, the transmission requesting means requests a transmission of video data for a predetermined number of screen images; and the remaining amount acquiring means includes initial screen number acquiring means for acquiring the number of screen image which can be reproduced by the video data stored in the video data buffer memory when the slow reproduction is designated by the slow reproduction designating means; and reproducible screen number calculating means for calculating the number of screen images which can be reproduced by the video data stored in the video data buffer memory based on the screen number acquired by the initial screen number acquiring means, the times when the control signal is outputted, and the times when the transmission requesting means issues the transmission request.

Furthermore, in the multi-media communication terminal apparatus, according to a still further aspect of the present invention, the video data transmitted through the communication line is coded; and the video data reproducing means includes: decoding means for decoding the video data; reproducing means for reproducing a screen image indicated by video data decoded by the decoding means; reproducing time counting means for counting the frequency of reproducing when each screen image is repeatedly reproduced by the reproducing means; subsequent screen decoding instruction means for instructing a decoding operation of video data as to a subsequent screen image by the decoding means when the counted value of the reproducing time counting means reaches a reproducing time corresponding to the slow reproducing operation; and control signal output means for outputting a predetermined control signal when the decoding operation of the video data for a single screen image by the decoding means is accomplished.

BRIEF DESCRIPTION OF THE DRAWING

The above-described objects, other features, and advantages of the present invention will become apparent from the following detailed description when taken in conjunction with the accompanying drawings, in which.

DETAILED DESCRIPTION OF THE PREFERRED EMBODIMENTS OF THE INVENTION

Figure 1:
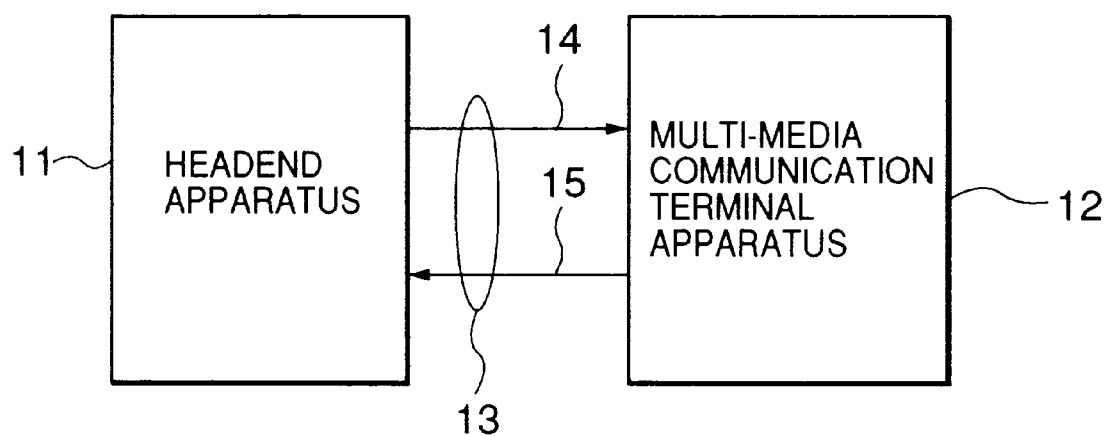
FIG. 1 is a schematic block diagram for showing a cable television system with employment of a multi-media communication terminal apparatus according to the present invention.

Referring now to the drawings, various preferred embodiments of the present invention will be described in detail.

FIG. 1 is a schematic block diagram for indicating an arrangement of a cable television system equipped with a multi-media communication terminal apparatus according to the present invention. In FIG. 1, a headend apparatus 11 is connected to a multi-media communication terminal apparatus 12 via a communication line 13. The headend apparatus 11 transfers various sorts of multi-media data in response to a demand issued from an audience. The multi-media communication apparatus 12 outputs the audience demand, and also reproduces multi-media data transmitted from the headend apparatus 11. The communication line 13 comprises a first transmission line 14 for transmitting multi-media data, and a control signal line 15 for transmitting various sorts of control signals such as the audience demand.

Figure 2:
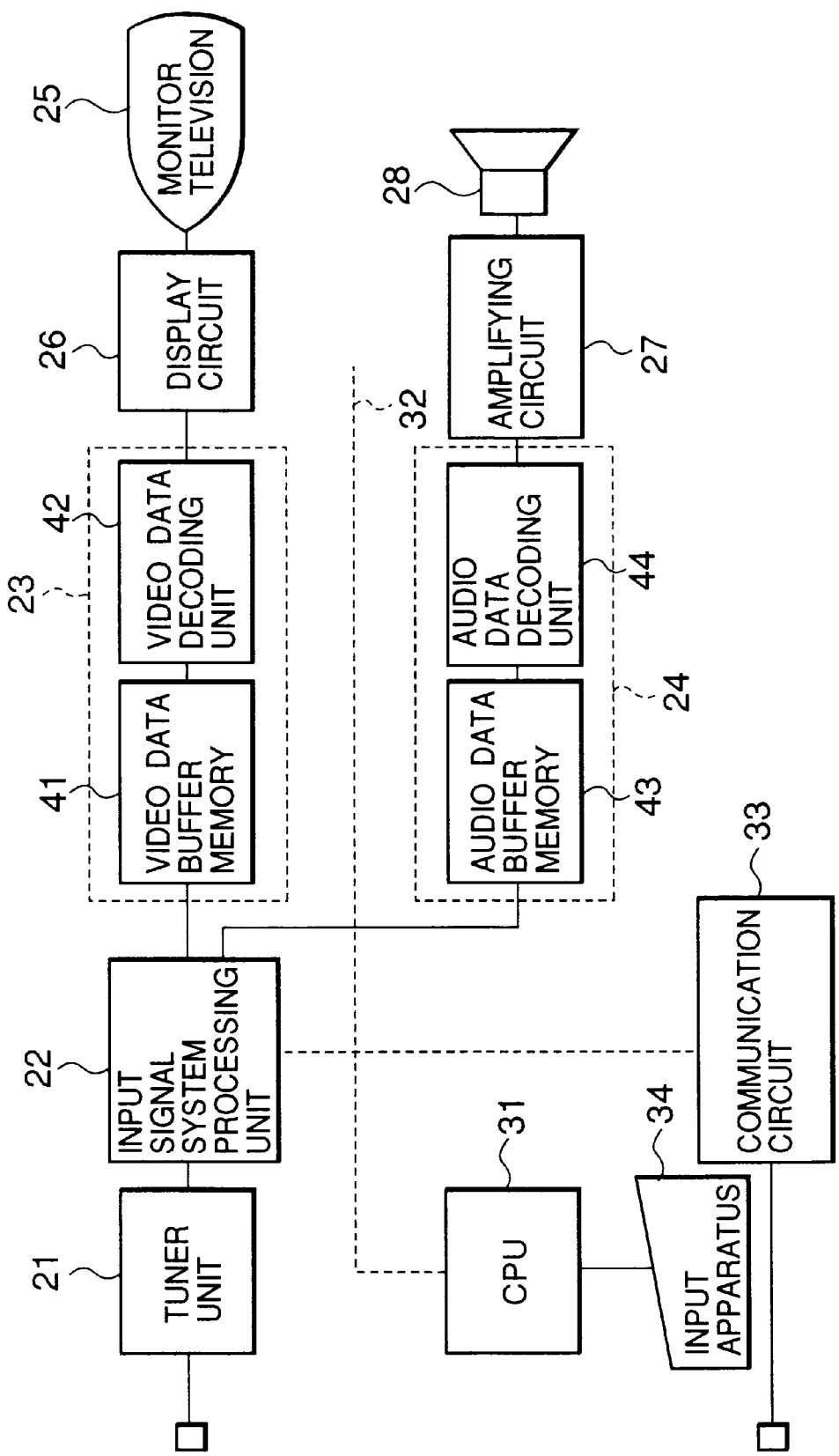
FIG. 2 is a schematic block diagram of a multi-media communication terminal apparatus according to an embodiment of the present invention.

FIG. 2 is a schematic block diagram for showing an embodiment of the multi-media communication terminal apparatus 12. In this embodiment, multi-media data sent via the transmission line 14 is inputted into a tuner unit 21 for selecting one desired channel from a plurality of channels and receiving multi-media data sent through such a channel. The multi-media data selectively received by the tuner unit 21 is entered into an input signal system processing unit 22 in order to separate this multi-media data into video (picture) data, audio data, and control data. The separated video data is supplied to a video data processing unit 23 for decoding the video data, whereas the audio data is supplied to an audio data processing unit 24 for decoding the audio data.

The decoded video data is inputted into a display circuit 26 for displaying this video data on the screen of a monitor television set 25. The video data is displayed on the monitor television 25 by the display circuit 26. The audio data, after decoded by the audio data processing unit 24, is amplified by an amplifying circuit 27, and then is reproduced from a speaker 28. The multi-media communication terminal apparatus 12 is equipped with a central processing unit (CPU) 31 performing various controls. To the CPU 31, a bus 32 is connected over which various sorts of signals are transmitted between respective modules employed in the multi-media communication terminal apparatus 12.

Also, a communication circuit 33 for transmitting/receiving a control signal via a control signal line 15 shown in FIG. 1 to/from the headend apparatus 11 is connected to this bus 32, in addition to the previously explained input signal system processing unit 22, video data processing unit 23, and audio data processing unit 24. An input apparatus 34 such as a keyboard is connected to the CPU 31.

The video data processing unit 23 includes a video data buffer memory 41 for temporarily storing video data entered from the input signal system processing unit 22, and a video data decoding unit 42 for reading out video data from the video buffer memory 41 to decode them.

The audio data processing unit 24 includes an audio data buffer memory 43 for temporarily storing audio data entered from the input signal system processing unit 22, and an audio data decoding unit 44 for reading audio data from the audio data buffer memory 43 to decode them.

Figure 3:
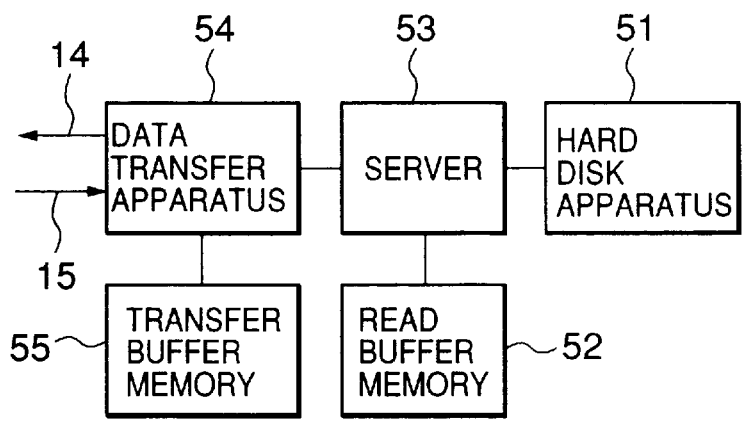
FIG. 3 is a schematic block diagram of a headend apparatus employed in the cable television system shown in FIG. 1.

FIG. 3 is a schematic block diagram for showing an arrangement of the headend apparatus 11 shown in FIG. 1. The headend apparatus 11 comprises a hard disk apparatus 51 for storing multi-media data such as video software, and a server 53 for reading out the data from the hard disk apparatus 51 in response to an audience demand, and for writing this read-out multi-media data into a read buffer memory 52 for temporary storage. Also, the headend apparatus 11 further comprises a data transfer apparatus 54. The data transfer apparatus 54 transfers the multi-media data via the transmission line 14, and also transmits/receives a control signal via the control signal line 15. A transfer buffer memory 55 for temporarily storing multi-media data to be transferred to the multi-media communication terminal apparatus 12 is connected to the data transfer apparatus 54.

Figure 4:
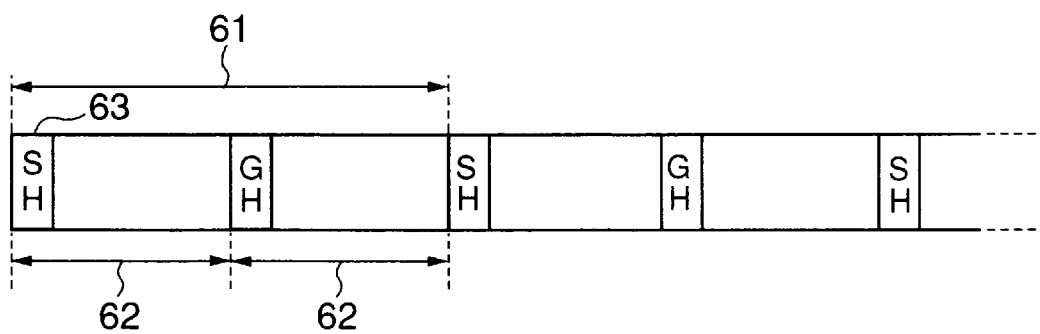
FIG. 4 represents a format of multi-media data transmitted from the headend apparatus shown in FIG. 3.

FIG. 4 represents a format of the multi-media data sent from the headend apparatus 11. The multi-media data is segmented into segments 61 each containing 30 frames of video data reproduced per second during normal reproducing operation. Each of these segments 61 is subdivided into two picture groups (Group of Picture, i.e., GOP) 62 each containing 15 frames of video data. A segment header code 63 is added to the head of each segment, and a picture group header code (GOP header code) is added to the boundary between the picture groups within each segment.

The amount of data contained in one segment is constant, and the amounts of data contained in the respective picture groups are substantially equal to each other. It should be noted that the amount of video data of each frame contained in a picture group are different from the ones of the other fourteen frames.

Figure 5:
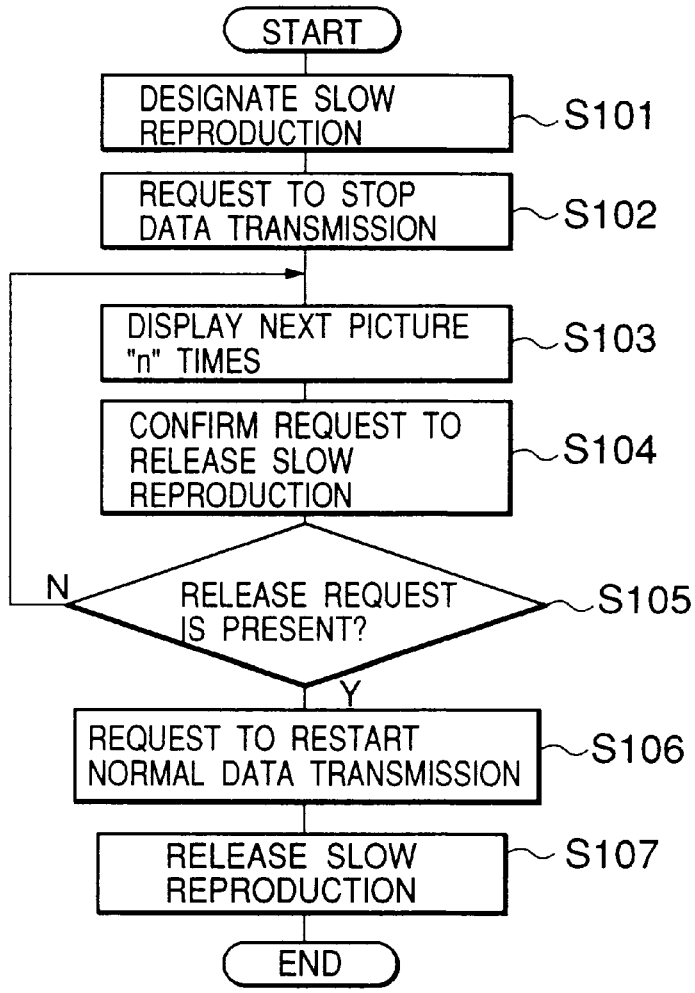
FIG. 5 is a flow chart for describing operations of the multi-media communication terminal apparatus of FIG. 2 when a slow reproducing operation is performed.

FIG. 5 is a flow chart for showing an operation of the multi-media communication terminal apparatus 12 when a slow repdoducing operation is carried out. The CPU 31 waits for an entry of a request command to execute the slow reproducing operation from the input apparatus 34 (step S101; N). When the slow reproducing operation is thus instructed (step S101; Y), an instruction is sent via the bus 32 to the communication circuit 33 to make the communication circuit 33 transfer a request, for stopping the transmission of video data, to the headend apparatus 11 (step 102).

Assuming now that a reproducing speed equal to 1/N of the normal reproducing speed is designated, the CPU 31 instructs the video data decoding unit 42 to repeatedly display one frame image to be reproduced after this instruction N times (step S103).

For example, when "2" is designated as the value of N, one frame image is reproduced in an image reproducing speed equal to half the normal reproducing speed. When "3" is designated as the value of N, one frame image is reproduced in an image reproducing speed equal to one-third of the normal reproducing speed. In the case that 30 frames of images are reproduced per second in the normal reproducing speed, when the value of N is selected to be "3", each of the images of the 30 frames is continuously displayed three times. It follows that 10 frames of images per second are reproduced. As a result, the slow reproducing operation is carried out in the slow reproducing speed equal to ⅓ of the normal reproducing speed.

When the above-described slow reproducing operation is executed, the amount of video data read from the video data buffer memory 41 per second is reduced, as compared with that in the normal reproducing speed. Accordingly, when the multi-media data are continuously supplied from the headend apparatus 11 in a predetermined rate fitted to the normal reproducing speed, the video data buffer memory 41 will overflow. To avoid this data overflow, the CPU 31 instructs the communication circuit 33 to send a transmission stop request to the headend apparatus 11 at step S102, by which the supply of the multi-media data is stopped.

Upon receipt of the transmission stop request, the headend apparatus 11 stops the supply of the multi-media data to the multi-media communication terminal apparatus 12 which has sent this transmission stop request via the transmission line 14. When the supply of the multi-media data is stopped, the video data remaining in the video data buffer memory 41 is gradually decreased. As a consequence, the CPU 31 monitors the remaining amount of video data in the video data buffer memory by executing another process operation not defined in the flow chart of FIG. 5. When the remaining amount is lower than the reference data amount, the CPU 31 requests the headend apparatus 11 to supply a predetermined amount of video data. A process operation for requesting video data will be discussed later in detail.

When the next image is continuously displayed N times and this continuous image display is complete, the CPU 31 checks to see whether or not a request to release the slow reproducing operation is entered through the input apparatus 34 (step S104). When no such request is inputted (step S105; N), the process operation is returned to step S103 at which the data of the next image is continuously reproduced N times. When the request to release the slow reproducing operation is entered (step S105; Y), the CPU 31 demands the communication circuit 33 via the bus 32 to send out such an instruction to the headend apparatus 11 (step S106). That is, the headend apparatus 11 continues to transfer the multi-media data in the normal reproducing speed (step S106). Upon receipt of this instruction, the communication circuit 33 sends a transmission restart request to the headend apparatus 11.

Also, the CPU 31 instructs the video data decoding unit 43 through the bus 32 to release the slow reproducing operation and then reproduce the video data in the normal speed (step S107). Upon receipt of this instruction, the video data decoding unit 43 changes the slow reproducing operation into the normal reproducing operation under which 30 frames of a single image are reproduced every one second as to each of these images.

Figure 6:
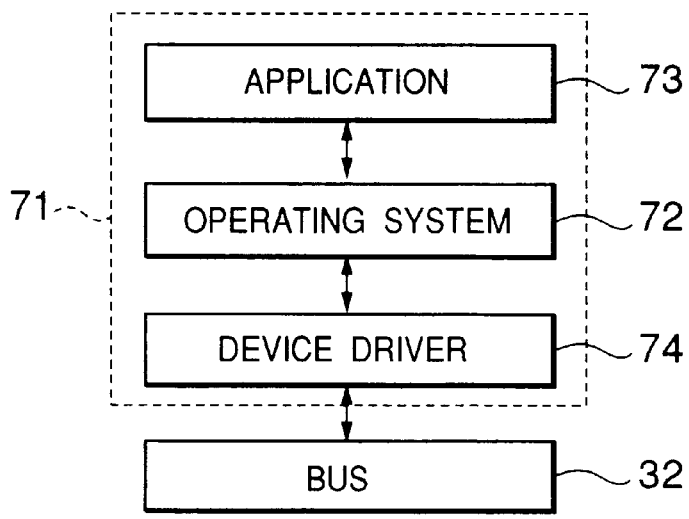
FIG. 6 schematically indicates a hierarchical structure of a software executed by a CPU employed in the multi-media communication terminal apparatus shown in FIG. 2.

FIG. 6 schematically indicates a hierarchical structure of software executed by the CPU employed in the multi-media communication terminal apparatus shown in FIG. 2. The software 71 is mainly constructed of an operating system (OS) 72, and an application 73 in an upper hierarchical layer, by which the signals entered from the input apparatus 34 such as the keyboard are analyzed and processed. Also, a device driver 74 is provided in a lower hierarchical layer of the operating system 72, by which various sorts of circuit apparatuses connected to the bus 32 are controlled.

Next, a description will now be made on a process flow operation when the video data is requested to the headend apparatus during the slow reproducing operation. The process to request the video data is carried out by the device driver 74 and the application 73 shown in FIG. 6. Every time video data about a new image is read from the video data buffer memory 41 to be reproduced, the video data decoding unit 42 issues an interrupt. While using the issue of interrupt as an initiation condition, both the device driver 74 and the application 73 confirm as to whether or not the video data is required, and request the headend apparatus 11 to supply the video data if required.

Figure 7:
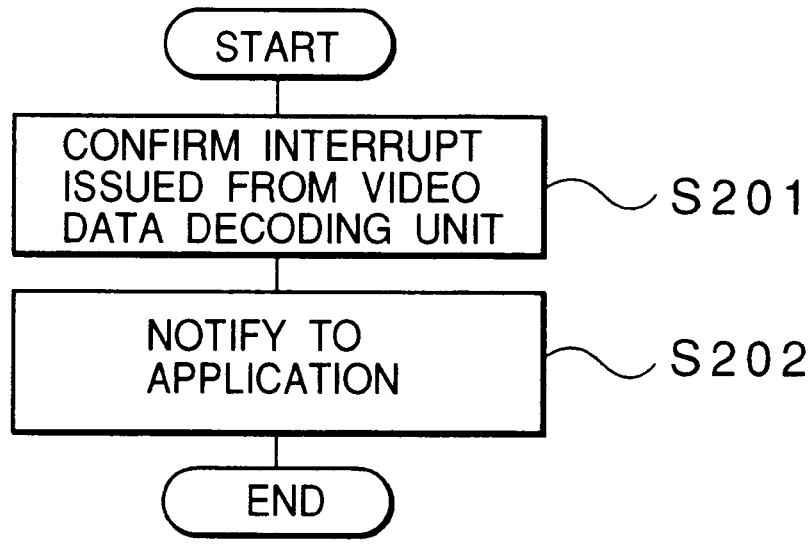
FIG. 7 is a flow chart for describing a process operation of a device driver when an interrupt is issued from a video data decoding unit shown in FIG. 2.

FIG. 7 is a flow chart for showing a process flow operation executed by the device driver when an interrupt is issued from the video data decoding unit 42. Upon receipt of the interrupt, the test driver 74 confirms that this interrupt is issued from the video data decoding unit 42 (step S201). For instance, an interrupt register for indicating whether or not the interrupt owned by the video data decoding unit 42 is present is read. Accordingly, an interrupt signal issued from the video data decoding unit 42 is turned "OFF". After the interrupt issued from the video data decoding unit 42 is confirmed, the device driver 74 notifies the issue of interrupt to the application 73 (step S202) and then the process operation is accomplished. This notification is reformed by a message communication function owned by the operating system 72.

Figure 8:
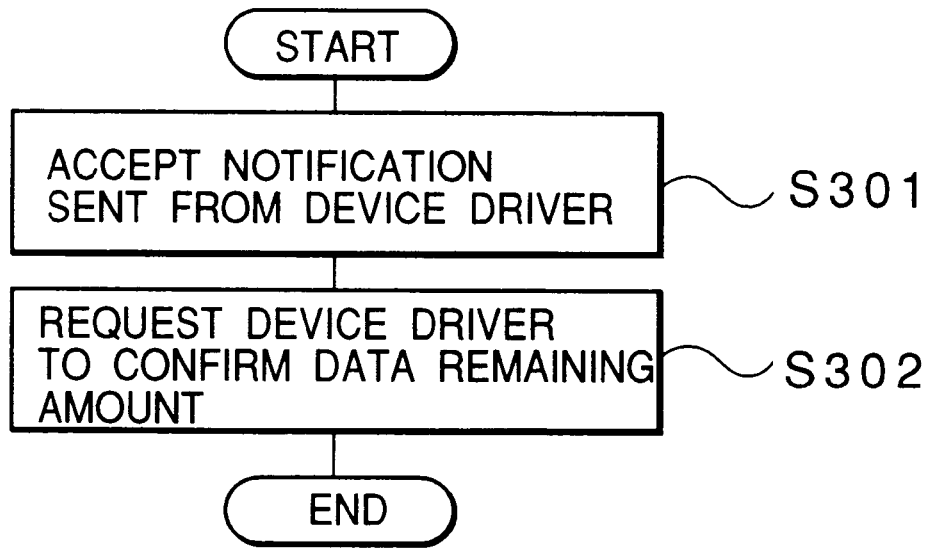
FIG. 8 is a flow chart for describing a process operation of an application software when a notification of an interrupt occurrence is received from the device driver.

FIG. 8 is a flow chart for showing a process operation executed by the application 73 upon receipt of the notification about the issue of interrupt from the device driver. When the application 73 receives such a notification that the interrupt is issued from the video data decoding unit 42 from the device driver 74 (step S301), the application 73 notifies such a request to the device driver, by which a confirmation is made of the data amount remained in the video data buffer memory 41 (step S302). Then, this process operation is accomplished (END).

Figure 9:
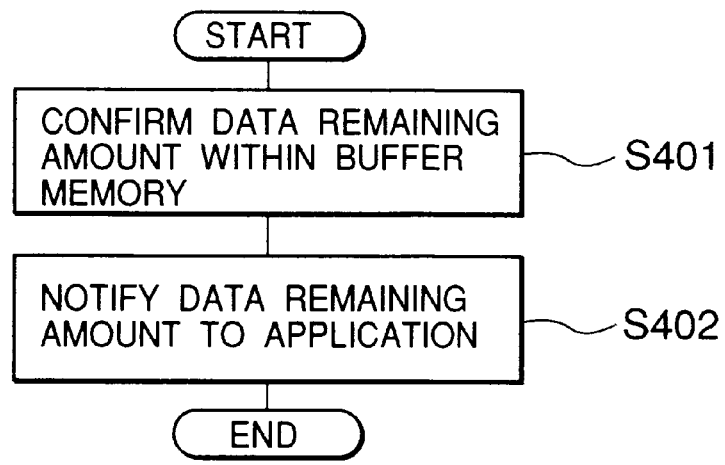
FIG. 9 is a flow chart for describing a process operation of the device driver when a request to conform a data amount is received from the application software.

FIG. 9 is a flow chart for describing a process operation executed by the device driver when the request to confirm the data amount is received from the application. Upon receipt of the notification about the request to confirm the data remaining amount from the application 73, the device driver 74 checks the remaining amount of the video data in the video data buffer memory 41 (step S401). Then, the device driver 74 notifies the data remaining amount to the application 73 (step S402).

Figure 10:
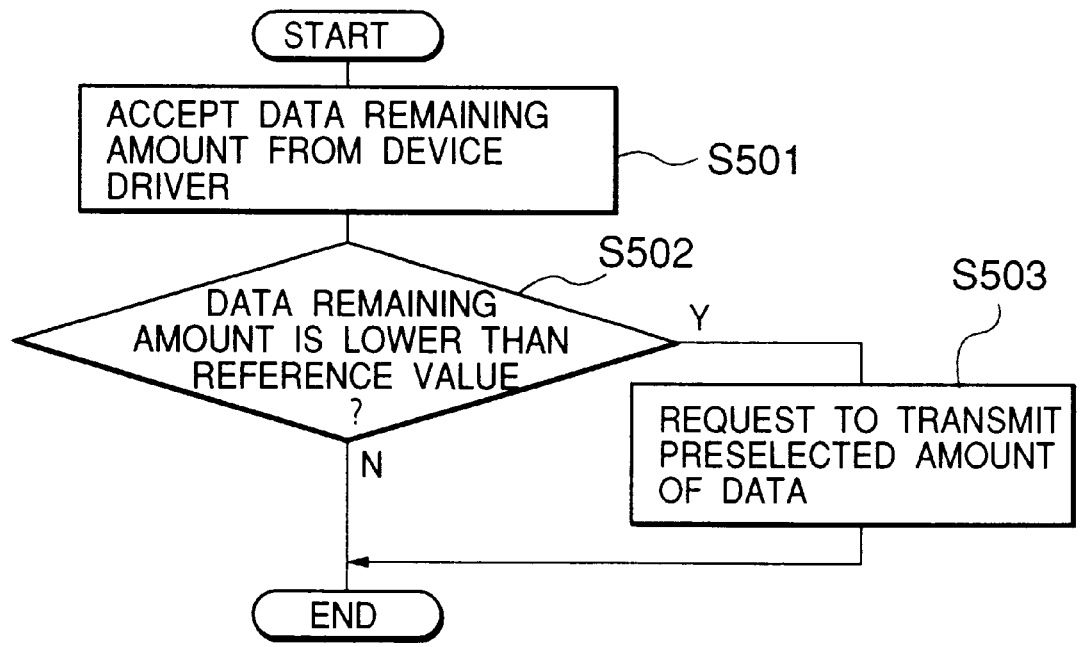
FIG. 10 is a flow chart for describing a process operation of the application software when a notification of a data remaining amount is received from the device driver.

FIG. 10 is a flow chart for showing a process operation executed by the application when the notification for inquiring the data remaining amount is sent from the device driver. When the notification for inquiring the data remaining amount within the video data buffer memory is received from the device driver 74 (step S501), the application compares this data remaining amount with a predetermined reference value used to judge as to whether or not a data transfer request is issued to the headend apparatus (step S502). When the data remaining amount is lower than, or equal to the reference value (step S502; Y), a request for transferring a preselected constant amount of multi-media data is sent to the headend apparatus 11 (step S503). When the data remaining amount is larger than or equal to the reference value (step S502; N), this process operation is ended without requesting the data (END).

It should be understood that the amount of the video data transmitted from the headend apparatus in response to a single request never exceeds such data amount that when this data amount transmitted from the headend apparatus is received, the video data buffer memory 41 does not overflow. It should also be noted that even after the video data is received in response to a single request, the total amount of the video data buffer memory must not become such a small amount that the remaining data amount thereof is below the reference value. In this case, such a request is issued that the video data for constituting a single picture group is requested to be sent from the headend apparatus 11 by one time. As a consequence, the reference value is set to such a value smaller than the remaining data amount of the empty region larger than a single picture group.

Since the data amount of a single frame is not constant, it is not possible to recognize the frame numbers remaining in the buffer based on the data remaining amount of the video data buffer memory 41. The reference value should be set to a data amount larger than the data amount reproducible during the overhead time defined by that after the data for a single picture group is requested to be sent from the headend apparatus 11, this data is transferred. Accordingly, in the case that the remaining data amount of the buffer memory is detected by the device driver, such a predetermined value larger than or equal to a data amount in the worst case (the largest data amount) for the number of frames reproduced by the overhead time must be set as the reference value. Also, the storage capacity of the video data buffer memory 41 must be set to such an amount defined by adding the data amount for a single picture group to the above-described reference value.

An interrupt is issued from the video data decoding unit 42 every time video data for a single frame is consumed. As a consequence, the frame number of the data remained in the video data buffer memory 41 may be managed based on this interrupt. Assuming now that the overhead time is known as time for "m" frames (symbol "m" being a positive integer), when the remaining data amount is decreased smaller than (m+1) data frames, the transfer request for a single picture group may be issued.

For instance, the frame number of the data remained in the buffer when the slow reproducing operation is commenced is calculated. Then, the total number of consumed frames is calculated by counting the number of interrupts issued from the video data decoding unit 42. Also, another number of frames increased by checking how many times the data in unit of the picture group (namely, 15 frames) have been received from the headend apparatus 11 are calculated after the slow reproducing operation is commenced. The number of consumed frame is subtracted from the frame number calculated when the slow reproducing operation is commenced, and thereafter the resultant frame number is added with the number of increased frames. As a consequence, the total number of frames remained in the buffer may be always calculated. When this calculated frame number becomes below the predetermined (m+1), the subsequent data request may be issued to the headend apparatus.

Alternatively, the frame number in the buffer at the time when the slow reproducing operation is commenced may be counted in unit of 15 frames by detecting the GOP headers from the data remained in the buffer. In this case, although 15-frame errors at maximum are produced as the frame number when the slow reproducing operation is started, the reference value may be set to include this 15-frame margin.

Next, a description will be made on operations of the headend apparatus when the multi-media data is transferred.

Figure 11:
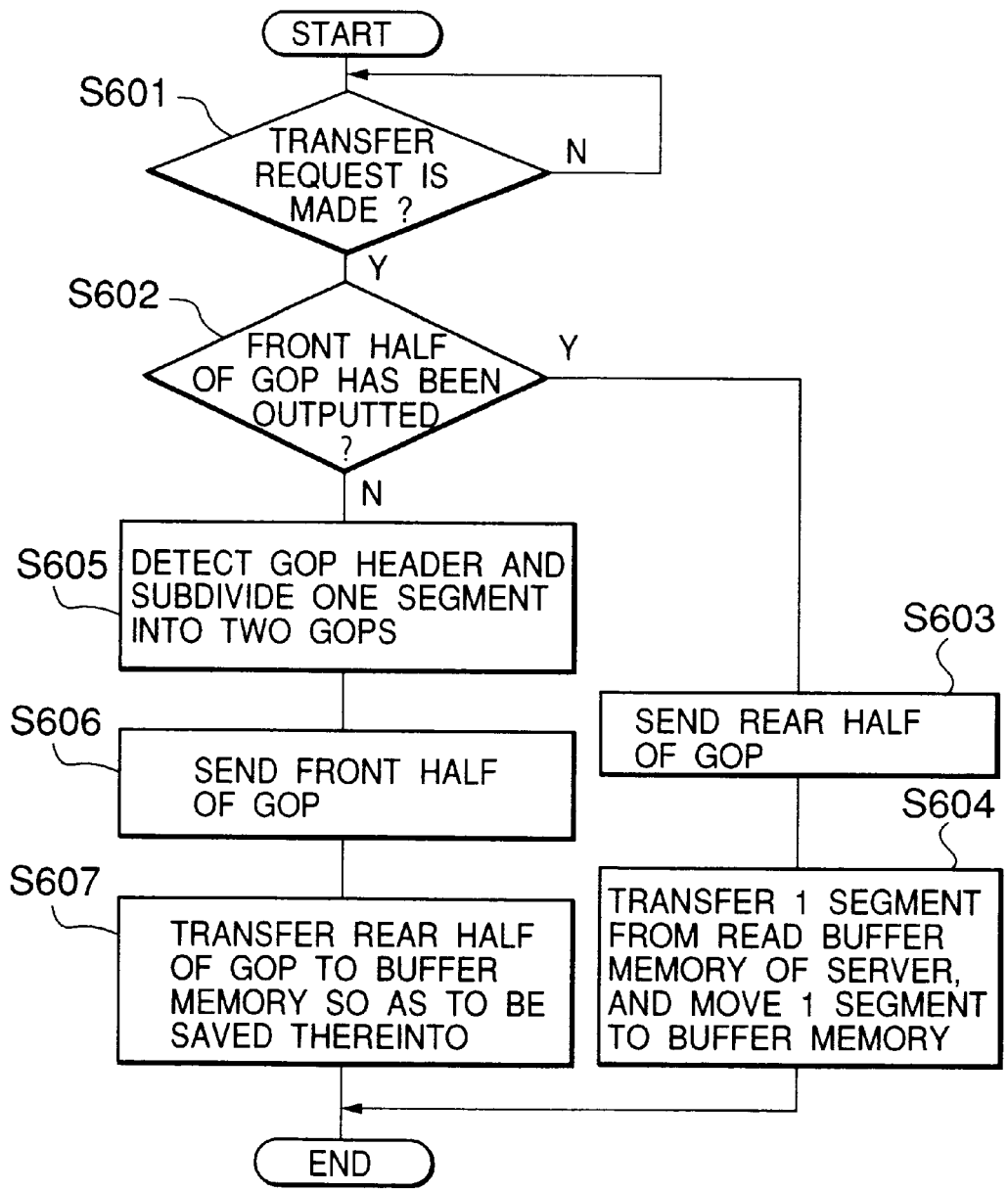
FIG. 11 is a flow chart for explaining an operation of the headend apparatus when multi-media data is transferred.

FIG. 11 is a flow chart for showing a flow operation of the headend apparatus when the multi-media data is transferred. This process operation indicates such operations of the headend apparatus that after the slow reproducing operation is commenced and a request to stop a data transmission is received, the data is transferred in unit of the picture group. The server 53 sequentially reads out the multi-media data in unit of the segment an indicated in FIG. 4 from the hard disk apparatus 51 in such a manner that the amount of data stored in the read buffer memory 52 is maintained larger than a predetermined amount.

The data transfer apparatus 54 of the headend apparatus 11 waits for a delivery of a transfer request from the multi-media communication terminal apparatus 12 (step S601; N). When the transfer request is delivered (step S601; Y), a check is made as to whether or not the first half of the picture group among the segments in the transfer buffer memory has already been transmitted (step S602).

When the first half of the picture group has been sent out (step S602; Y), the second half of the picture group in this segment is transferred to the multi-media communication apparatus 12 (step S603). Thereafter, the data of one segment is moved from the read buffer memory 52 connected to the server 53 (step S604), and then this process operation is completed (END).

When the first half of the picture group has not yet been sent out (step S602; N), the data of a single segment stored in the transfer buffer memory 55 is subdivided into two picture groups by detecting the GOP header (step S605). Another first half of the picture group within the two subdivided picture groups is sent to the multi-media communication terminal apparatus 12 (step S606), and another second half of the picture group is directly held in the transfer buffer memory 44 (step S607). As described above, the headend apparatus 11 sends out the video data for a single picture group every time the transfer request is delivered from the multi-media communication terminal apparatus 12.

In the above-explained embodiment, every time a new frame is decoded, the data amount within the video data buffer memory 41 is investigated on the basis of the interrupt issued from the video data decoding unit. Alternatively, the interrupt may be issued based on a vertical synchronization signal (V-SYNC) produced when a picture is reproduced. When the slow reproducing operation is carried out in the 1/N speed, the interrupts are produced N times in response to the vertical synchronization signal while the data for a single frame is consumed. As a consequence, the interrupts N times larger than those issued from the video data decoding unit 42 may be produced, so that the workloads to execute the process operation for confirming the data remaining amount are increased. However, if the data remaining amount is confirmed only one time with respect to the interrupts issued N times, then a total data amount for the process operation may be reduced.

As previously described, according to the present invention, since one image is repeatedly reproduced a plurality of times corresponding to the slow reproducing operations and the control signal is outputted when the reproducing operation for a new image is commenced, the remaining data amount can be confirmed at the timing when the image data for a single image is actually consumed. As explained above, when the video data for a single image is consumed, the remaining data amount is checked. Accordingly, the workloads required for executing the process operation to check the remaining data amount can be reduced, as compared with such a case that the remaining data amount is checked at such a timing irrelevant to the amount of the consumed video data, for instance, the timer interrupt.

Furthermore, according to the present invention, since the reference amount is set to the value larger than the amount of the video data consumed until the requested picture data is received, there is no such problem that the video data buffer memory becomes empty while the video data is requested and thereafter this requested video data is transferred, and thus the data reproducing operation is interrupted. Also, the storage capacity of the video data buffer memory is made larger than such an amount obtained by adding the data amount transferred in response to a single transmission request with the predetermined reference amount. Accordingly, even when the video data has been transferred within a short period of time after the request is issued, there is not risk that the video data buffer memory may overflow.

In addition, according to the present invention, since the data amount of the video data remained in the video data buffer memory is managed based on the number of images reproducible by this data amount, even when the video data is coded, the next transmission request can be made at proper timing.

Furthermore, in accordance with the present invention, even when the video data is coded, the remaining data amount of the video data memory can be checked every time the video data for a single image is consumed. As a result, the workload required to check the remaining data amount can be reduced.

What is claimed is:

1. A multi-media communication terminal apparatus comprising:

a video data buffer memory for temporarily storing video data transmitted via a communication line;

a slower-than-normal reproduction designating unit for designating a slower-than-normal reproduction of said video data;

a video data reproducing unit for reproducing each screen image indicated by said video data when said slower-than-normal reproduction is designated by said slower-than-normal reproduction designating unit, and for outputting a predetermined control signal when the reproduction of a new image is commenced, said each screen image being reproduced a plurality of times corresponding to said slower-than-normal reproduction;

a transmission stop requesting unit for requesting a transmission source of said video data to stop the transmission of said video data which is transmitted via said communication line when said slower-than-normal reproduction is designated by said slower-than-normal reproduction designating unit;

a remaining amount acquiring unit for checking the amount of video data remaining in said video data buffer memory when said control signal is outputted from said video data reproducing unit; and a transmission requesting unit for requesting said transmission source to transmit a predetermined amount of said video data when said amount acquired by said remaining amount acquiring unit is lower than or equal to a predetermined reference amount.

2. A multi-media communication terminal apparatus as claimed in claim 1, wherein:

said reference amount corresponds to a predetermined amount which is larger than the amount of video data reproduced by said video data reproducing unit during a overhead time required after a transmission request of video data is issued until the video data is transmitted via said communication line; and the storage capacity of said video data buffer memory is greater than an amount defined by adding said predetermined amount when transmission is requested by said transmission requesting unit to said reference amount.

3. A multi-media communication terminal apparatus as claimed in claim 1, wherein:

said transmission requesting unit requests transmission of video data for a predetermined number of screen images; and said remaining amount acquiring unit includes:

an initial screen number acquiring unit for acquiring the number of screen images which can be reproduced by said video data stored in said video data buffer memory when said slower-than-normal reproduction is designated by said slower-than-normal reproduction designating unit; and a reproducible screen number calculating unit for calculating the number of screen images which can be reproduced by said video data stored in said video data buffer memory based on said screen number acquired by said initial screen number acquiring unit, the times when said control signal is outputted, and the times when said transmission requesting unit issues said transmission request.

4. A multi-media communication terminal apparatus as claimed in claim 1, wherein said video data transmitted through said communication line is coded; and said video data reproducing unit includes:

a decoding unit for decoding said video data;

a reproducing unit for reproducing a screen image indicated by video data decoded by said decoding unit;

a reproducing time counting unit for counting the frequency of reproducing when each screen image is repeatedly reproduced by said reproducing unit;

a subsequent screen decoding instruction unit for instructing a decoding operation of said video data as to a subsequent screen image by said decoding unit when the counted value of said reproducing time counting unit reaches a reproducing time corresponding to the slower-than-normal reproducing operation; and a control signal output unit for outputting a predetermined control signal when said decoding operation for a single screen image by said decoding unit is accomplished.

* * * * *